E. M. HAMILTON.
AUTOMOBILE TIRE.
APPLICATION FILED DEC. 17, 1910.
1,026,803.
Patented May 21, 1912.
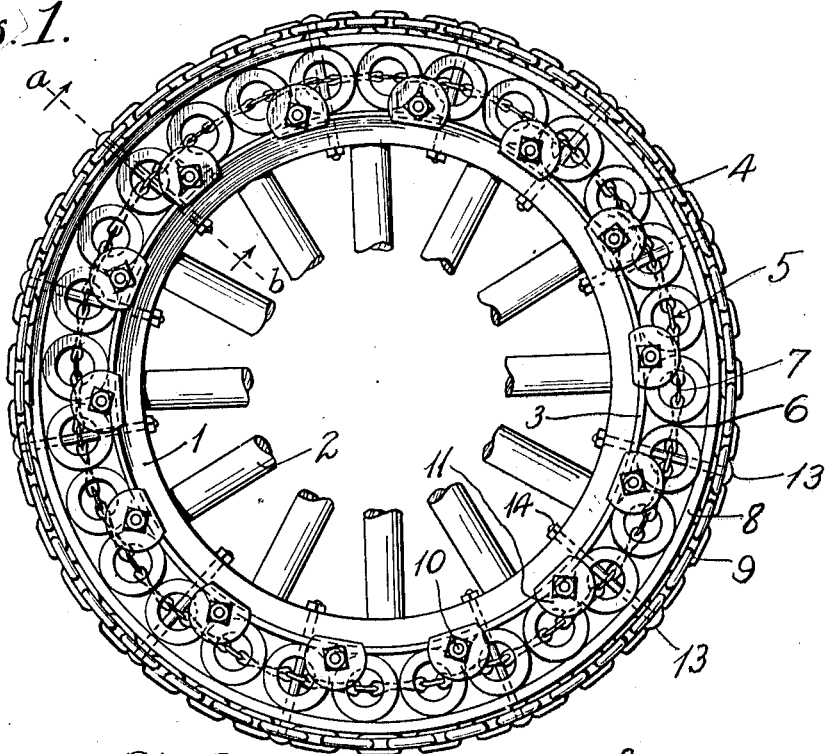
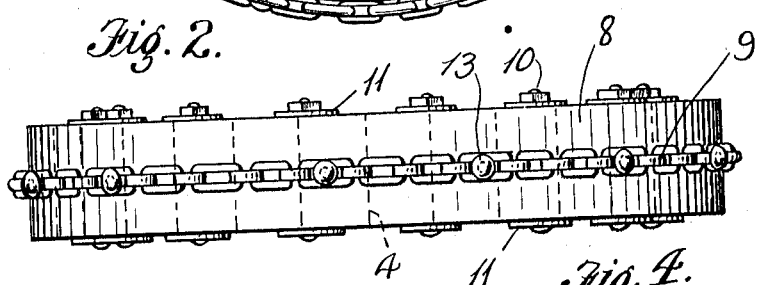
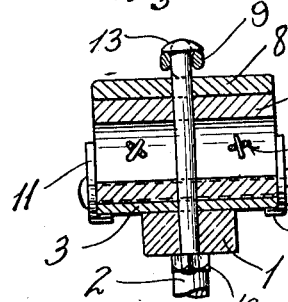
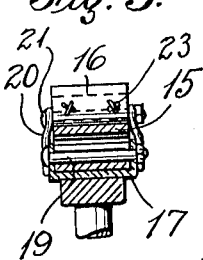
Inventor:
Ezra M. Hamilton.

UNITED STATES PATENT OFFICE.

EZRA M. HAMILTON, OF WILLOW SPRINGS, CALIFORNIA.

AUTOMOBILE-TIRE.

1,026,803. Specification of Letters Patent. Patented May 21, 1912.

Application filed December 17, 1910. Serial No. 597,937.

*To all whom it may concern:*

Be it known that I, EZRA M. HAMILTON, a citizen of the United States, residing at Willow Springs, county of Kern, State of California, have invented new and useful Improvements in Automobile-Tires, of which the following is a specification.

This invention relates to improvements in tires for vehicle wheels, and it is the object of the invention to provide a resilient and economical tire which is not likely to get out of order easily or to slip in use upon various kinds of roads and which may be applied to all classes of vehicles, and particularly to automobiles.

With these and other objects in view the invention comprises the novel constructions, combinations, and arrangements of parts hereinafter described and claimed.

In the accompanying drawing, Figure 1 is a side elevation of the rim portion of a wheel showing the improved tires applied thereto. Fig. 2 is an edge elevation of the said wheel showing the tread portion of the tire. Fig. 3 is an enlarged detail sectional view through the rim and tire of a vehicle wheel provided with this invention, the section being taken on the line $a$—$b$ of Fig. 1. Fig. 4 is a side elevation of a portion of a vehicle wheel with a modified form of the improved tire applied thereto. Fig. 5 is a detailed sectional view taken upon the line $c$—$d$ of Fig. 4.

In the drawing in which the preferred embodiment of the invention is illustrated, 1 indicates the felly or rim of a wheel in which are fitted the spokes 2 of any desired construction. Upon the said felly 1 is applied a metallic rim or tire 3, the said tire 3 being preferably made considerably wider than the felly 1. Mounted upon the outer surface of the tire 3 are a series of transversely arranged yielding tubes as 4 which are cut of such a length as to equal the width of the tire 3 when they are applied upon the same transversely as shown in the drawing. While these tubes 4 may be made of any desired material they are usually made of ordinary hose pipe cut in the desired lengths. The tubes 4 are held with respect to each other by means of a series of chains 5 which extend through the tubes from side to side and reach entirely around the tire as clearly shown in Fig. 1. The links afford a flexible connection for holding the yielding tubes 4 in position and thus do not interfere with the resilient action of said tubes. While one of said chains 5 may be employed within the spirit of the invention, two of said chains are usually employed as indicated in Fig. 3. In arranging the chains through the tubes one link as 6 preferably passes through the adjacent walls of two tubes 4 and is connected to other links arranged in this manner. The connecting links 7 are usually arranged within the tubes.

Upon the outer surfaces of the tubes 4 is applied a resilient rim or tire as 8, usually made of rubber fabric or material having similar qualities. The tread of the tire is also generally protected by a chain 9 having comparatively flat links as illustrated in Figs. 1 and 2. The resilient portion of the tire is held against lateral movement upon the inner rim 3 by means of transverse bolts 10 which extend from side to side and engage washers or gripping plates 11 mounted upon each side of the tire. The said plates or washers 11 have inturned flanges 12 which overhang the inner edges of the inner rim or tire 3 so that the plates are prevented from twisting out of place and having positive engagement with said rim 3. The washers 11 also project well over the adjacent edges of each pair of tubes 4 as shown in Fig. 1 so that the said tubes are prevented from having movement. The use of the bolts 10 and the washers 11 also make it possible to apply the improved tire to many classes of vehicle wheels in common use.

Automobile wheels especially are generally provided with wide edged metallic tires mounted upon the felly thereof. To further secure the tire in place bolts 13 are passed through the same at intervals and secured to the felly by nuts 14. These bolts usually extend through the chain 9, the flexible rim 8, one of the tubes 4, and the inner rim or tire 3 together with the felly 1. In this manner the whole structure is further anchored in place and cannot work around the periphery of the wheel when not used.

Sometimes it is desirable to increase the resiliency of the tire by employing two rows of transverse flexible tubes as at 15 and 16 in Figs. 4 and 5. In such event the inner rim 17 of the tire is usually formed with outwardly extending flanges 18 between which the inner tubes 15 are mounted. Transverse bolts 19 passing through said flanges and the said tubes hold the inner tubes in position. The outer row of tubes 16 are arranged to rest partially between the inner tubes 15 and are movable held in place by elongated links 20 which engage pins or bolts 21 extended through each of said tube sections, the inner ends of said links engaging studs or head projections 22 projecting from the flanges 18 of the rim 17. A flexible connecting means as for instance a chain 23 is passed through the central portions of the outer row of tube sections 16. With this tire the outer tube sections themselves may be laid to form the tread portion of the tire.

In either form of the device described and shown the chains, bolts and washers are all so adjusted so as to conform to the movement of the rubber portions of the tire and to not interfere with the elasticity of the rubber.

What I claim is:

1. A vehicle tire, comprising a rim, a series of transversely yielding tube sections mounted thereon and a chain passed through the central portion of said tube sections for flexibly connecting them and binding them to the rim of the wheel, and means for further limiting the outward movement of said sections with respect to said rim.

2. A vehicle tire, comprising a rim, a plurality of transversely arranged tube sections of yielding material mounted upon said rim, a tread rim for holding said sections to the said rim, and a chain passed through the adjacent walls of said sections for flexibly holding them in place and further holding the said sections upon the rim of the wheel.

In witness that I claim the foregoing I have hereunto subscribed my name this 10th day of December, 1910.

EZRA M. HAMILTON.

Witnesses:
 FRED BURGESON,
 WM. M. TALBOT.

---

Copies of this patent may be obtained for five cents each, by addressing the " Commissioner of Patents, Washington, D. C."